Nov. 3, 1964　　　A. P. JAMES　　　3,155,192
BEARING LUBRICATING DEVICES
Filed July 30, 1962　　　3 Sheets-Sheet 1

Nov. 3, 1964    A. P. JAMES    3,155,192
BEARING LUBRICATING DEVICES
Filed July 30, 1962    3 Sheets-Sheet 2

Inventor:
Alec P. James
By Kemon, Palmer,
Stewart & Estabrook,
Attorneys

Nov. 3, 1964　　　A. P. JAMES　　　3,155,192
BEARING LUBRICATING DEVICES
Filed July 30, 1962　　　3 Sheets-Sheet 3

Inventor
Alec P. James
By Kenyon, Palmer,
Stewart & Estabrook
Attorneys huge# United States Patent Office 3,155,192
Patented Nov. 3, 1964

3,155,192
BEARING LUBRICATING DEVICES
Alec P. James, 8 Edwards Road, Birmingham, England
Filed July 30, 1962, Ser. No. 213,216
Claims priority, application Great Britain, Aug. 1, 1961,
27,821/61
8 Claims. (Cl. 184—15)

This invention concerns lubricating the bearings of parts of machinery as the parts move along from one position to another. An example of machinery having such moving parts is an endless conveyor comprising spindles, rollers or the like which move with the conveyor and which are to be lubricated as the conveyor is moving. However, the invention is of general application where a part to be lubricated is moved past a fixed station.

According to this invention there is provided a unit for pumping the lubricant to the moving part to be lubricated said unit comprising a rod for attachment at one end to said part so that the rod extends transversely of the direction of movement of said part, a piston and an open-ended cylinder mounted on the rod for relative axial movement so that the piston is withdrawable from the open end of the cylinder to provide a space between the piston and the cylinder, means urging the piston into the cylinder, means engageable by the unit as it is moved along the said part to withdraw the piston from the cylinder and means for introducing lubricant to the unit through said space when the piston is withdrawn from the cylinder. It is preferred that the rod extends across said space from the piston to the cylinder when the piston is withdrawn from the cylinder and the lubricant is applied to the exposed portion of the rod as the unit is moved along with said part by engagement thereby of the exposed portion of the rod with a lubricant carrier.

Figure 1:
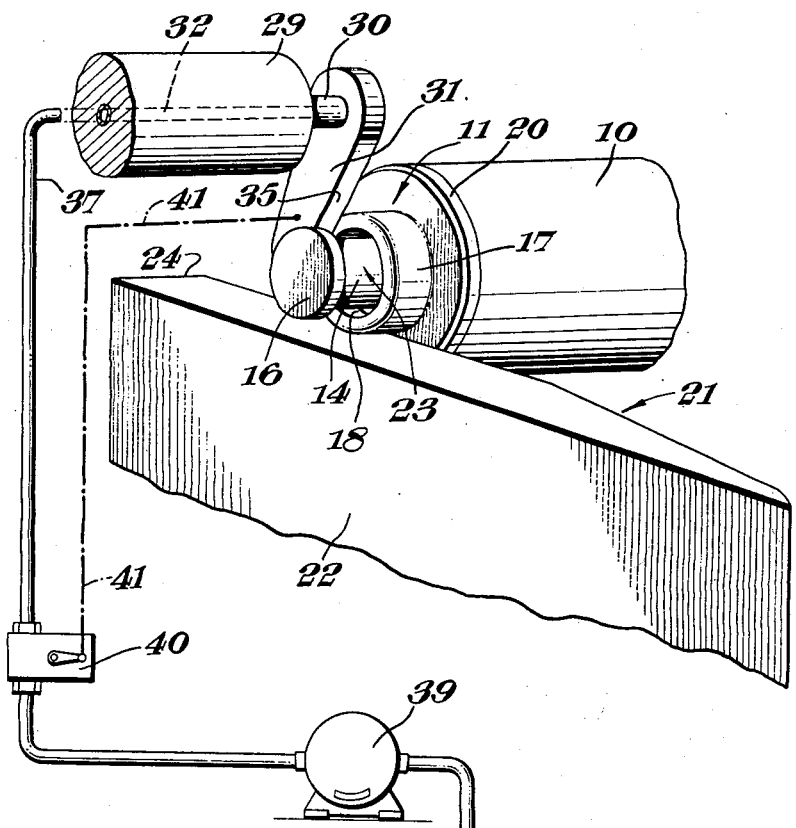
Figure 2:
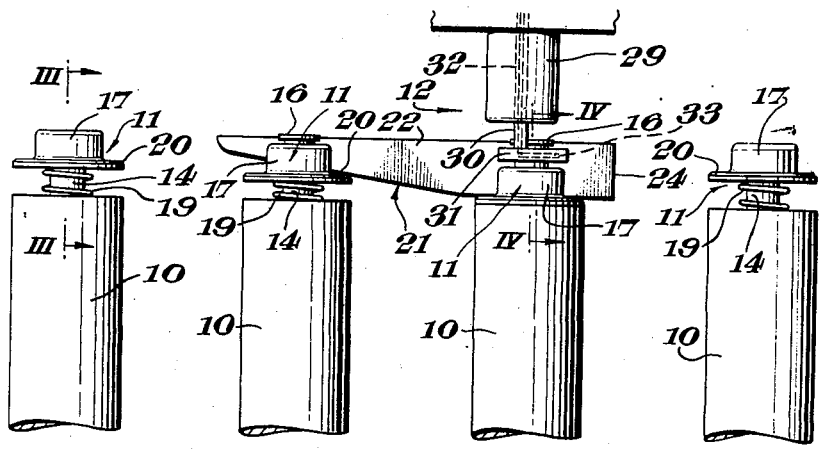

A practical application of the invention will now be described, by way of example only, with reference to the accompanying drawings whereof:

FIG. 1 is a perspective view of one spindle of an endless conveyor incorporating a lubricant pumping unit according to this invention, FIG. 2 is a plan view of a group of conveyor spindles according to the present invention.

Figure 4A:
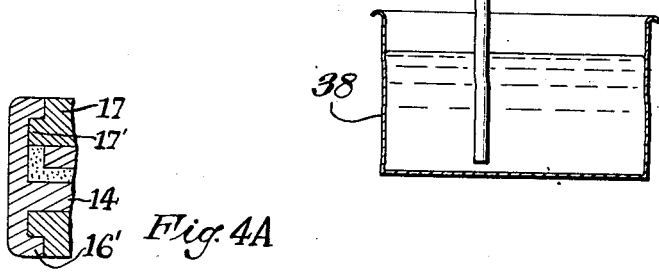
Figure 3:
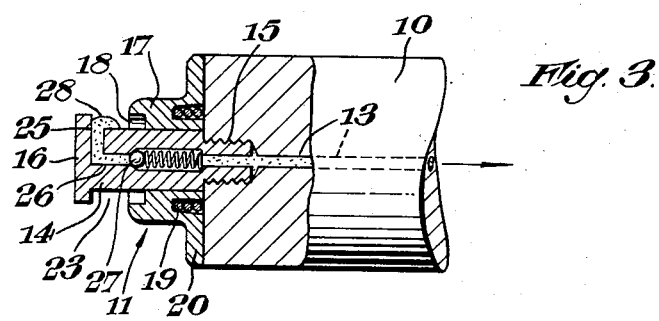
Figure 4:
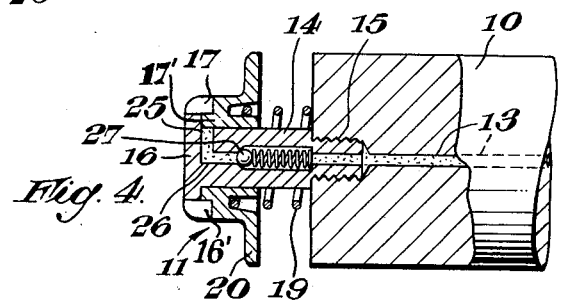
Figure 5:
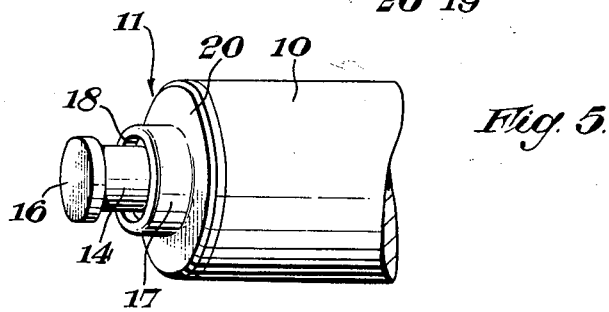
Figure 6:
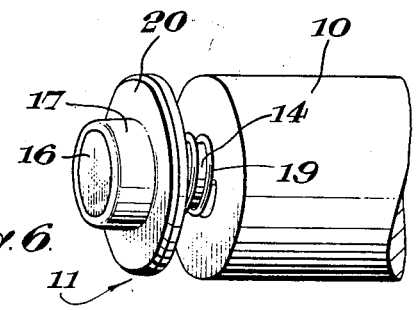

FIGS. 3 and 4 are sections respectively on the lines III—III and IV—IV of FIG. 2 and showing the pumping unit only, FIG. 4A is a scrap section corresponding to FIG. 4 but illustrating an alternative arrangement, FIGS. 5 and 6 are perspective views respectively of the pumping unit shown in FIGS. 3 and 4, and FIGS. 7, 8 and 9 are schematic views showing how lubricant is applied to the pumping unit.

The spindles of the endless conveyor are indicated at 10. One end of each spindle 10 carries a lubricant pumping unit 11. The spindles move in succession past a fixed station 12 (FIG. 2) at which lubricant is introduced successively to each unit. The spindle has an axial passage 13 to convey lubricant from the unit 11 to the spindle bearing (not shown).

The unit 11 comprises a rod 14 one end of which is screw threaded (at 15) for removable connection to one end of spindle 10. The other end of rod 14 carries a piston 16. A member 17 is slidably mounted on rod 14 for axial movement between piston 16 and spindle 10. Member 17 is formed with an open-ended cylinder (or recess) 18 to receive piston 16. A spring 19 urges the member 17 so that the piston is within the cylinder 18. Member 17 has an annular flange 20. As the spindles 10 are moved through the station 12 flanges 20 of successive members 17 engage an inclined surface 21 (FIG. 2) of a stationary bar 22 with the result that each member 17 is pushed by a camming action against the action of its spring 19 to relatively withdraw the piston 16 from the cylinder. When the piston is fully withdrawn there is a space 23 (FIG. 3) between the piston and the cylinder and the rod 14 is exposed therein.

When a unit 11 is moved away from station 12 the flange 20 abruptly disengages bar 22—the latter being formed with end face 24 at right angles to the direction of movement of the conveyor for this purpose—and spring 19 moves member 17 so that piston 16 is relatively re-introduced to cylinder 18.

Thus, as each spindle is moved through station 12, the piston 16 is relatively withdrawn from cylinder 18 thereby exposing rod 14 between the piston and the cylinder and thereafter the piston is relatively forced into the cylinder by spring 19. The latter continues so as to urge the piston into the cylinder as the conveyor moves away from station 12.

A port 25 in rod 14 communicates with an axial hole 26 which extends through end 15 thereof. Hole 26 is aligned with passage 13. A non-return ball valve 27 is provided within rod 14.

Assuming that member 17 is moved to compress spring 19 and that some lubricating grease 28 (FIG. 3) is applied to the exposed portion of rod 14 (i.e. between cylinder 18 and piston 16, the latter being relatively withdrawn from the cylinder) and thereafter member 17 is released; the grease is trapped within the cylinder by the piston and spring 19 ultimately forces the cylinder to the position of FIG. 4. The grease 28 is therefore pumped through hole 26, past valve 27 into passage 13 and thence to the bearings of spindle 10. This pumping action will commence immediately after the pumping unit 11 has left station 12 and continues as the conveyor is moving along until substantially all the lubricant 28 placed on rod 14 at station 12 has been fed to the bearings. It is arranged that this is accomplished before the spindle returns to station 12. In this way the spindle bearings are lubricated each time the spindle moves through station 12.

Figures 7, 8, 9:
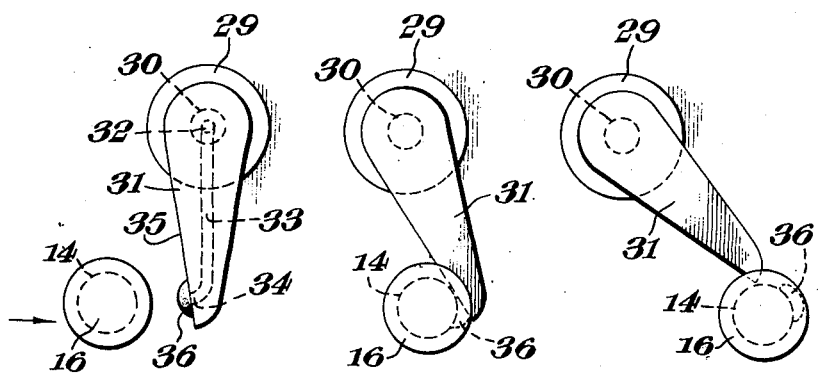

Referring now to FIGS. 2, 7, 8 and 9: at station 12 there is a bearing block 29 which receives a shaft 30 carrying an arm 31. The shaft 30 has an axial conduit 32 therethrough which communicates with an internal duct 33 extending lengthwise of arm 31 and leading to an outlet 34 in the side face 35 of the arm. Conduit 32 is connected by pipe 37 with a supply of lubricating grease (diagrammatically shown in FIG. 1 at 38) which is delivered under pressure by pump 39 in a measured quantity with the result that a mass or blob of grease 36 collects at outlet 34 (FIG. 7). The arm 31 swings freely and normally hangs in the vertical position shown in FIG. 7. The lower end of arm 31 is then in position to engage the portion of rod 14 exposed in space 23 between piston 16 and member 17 in such manner that the blob 36 is wiped off face 35 by the exposed rod as the spindle moves along. This is shown in FIGS. 8 and 9. Immediately after the position of FIG. 9 rod 14 disengages the arm 31 which falls freely to the position of FIG. 7.

To ensure that the measured quantity of grease is delivered to arm 31 only at the correct time a valve 40 (FIG. 1 may be provided which is actuated by rotation of shaft 30 (e.g. through a linkage indicated schematically at 41), the valve being opened while the arm falls to its vertical position.

With the arrangement described a measured quantity of lubricant is automatically supplied to each conveyor spindle as it passes the lubricating station 12 and this function is independent of the distance between the spindles and the speed of the conveyor. The quantity of grease supplied to each bearing is easily regulated and it may be readily arranged that lubricating grease is supplied to arm 31 for each spindle of the conveyor during a single complete rotation of the conveyor and thereafter that for a specified number of complete rotations no lubricant is supplied to the arm.

In one alternative arrangement as indicated in FIG. 4A, the cylinder 16' may be integral with the rod 14, one end of member 17 having an axial projection 17' which constitutes the piston. The operation is otherwise equivalent to that described above.

In either arrangement described above it may be provided that the lubricant trapped by the piston within the recess is forced to the spindle bearings by means additional to the force of the spring acting on the cylinder. Thus, as applied to the arrangement illustrated in FIG. 2 of the drawings: a plunger 42 passes through the piston 16 and a rod 14 and into hole 26. The latter constitutes a cylinder for the plunger. The plunger is urged by spring 43 outwardly and is forced inwardly by engagement with an inclined surface 44 extending alongside the conveyor so that the plungers force the lubricant from units 11 as the spindles move past the inclined surface after leaving station 12. In this way the lubricant can more effectively be delivered to the bearings.

While the invention has particular application to conveyors it is not so limited and may be used generally where a bearing to be lubricated is moved past a station.

The ball valve 27 may be dispensed with in certain circumstances since the piston is within its cylinder except when lubricant is being placed on the piston rod.

I claim:

1. For pumping lubricant to a moving part of a machine, a unit comprising a rod attached at one end to said part so that the rod extends transversely of the direction of movement of said part, a piston/cylinder assembly including a piston and an open-ended cylinder mounted on the rod for relative axial movement so that the piston is withdrawable from the open end of the cylinder to provide a space between the piston and the cylinder, an axial hole in the rod to communicate with a lubricant-conveying passage in the moving part, a radial port leading into the axial hole from the cylinder when the piston is within the cylinder and spring means urging the piston into the cylinder.

2. A unit as claimed in claim 1 having a non-return valve in said axial hole which permits lubricant to be forced by said spring means from the cylinder to the lubricant-conveying passage.

3. A unit according to claim 1 wherein of the two members of the piston/cylinder assembly one member is secured to said rod and the other member is mounted on the rod for axial movement therealong and is urged by said spring means axially of the rod to bring the piston into the cylinder, and such movable member presents a flange to engage a stationary means as the member is carried along with said moving part whereby the piston is withdrawn by a camming action from the cylinder against the action of said spring means.

4. An installation comprising an endless conveyor having a series of spindles movable in a direction normal to the spindle axis, a unit in accordance with claim 1 projecting from an end of each spindle for pumping lubricant to a bearing of such spindle, and located at a fixed station means engageable by the units as the latter are moved along with the conveyor spindles one such means to relatively withdraw the piston from the cylinder of each unit in succession and another such means to introduce lubricant to each unit in succession through said space between the piston and cylinder when the piston is thus withdrawn from the cylinder.

5. For pumping lubricant to a moving part of a machine, a unit comprising a rod attached at one end to said part so that the rod extends transversely of the direction of movement of said part, a piston cylinder assembly including a piston and an open-ended cylinder of which one member is secured to said rod and the other member is mounted on the rod for axial movement therealong so that the piston is withdrawable from the open end of the cylinder to provide a space between the piston and the cylinder, a port in the rod leading from the cylinder into communication with a lubricant-conveying passage in the moving part when the piston is within the cylinder, and spring means urging the axially movable member of the piston/cylinder assembly axially of the rod to bring the piston into the cylinder, in combination with station means engageable by the unit as it is moved along with said part to co-act with said axially movable member to withdraw the piston from the cylinder against the action of said spring means and to introduce lubricant to the unit through said space when the piston is thus withdrawn.

6. A combination according to claim 5 in which the means to withdraw the piston from the cylinder comprises a stationary member having an inclined surface to engage the movable member of the piston/cylinder assembly as the unit is moved along with the part to be lubricated.

7. A combination according to claim 5 wherein the means to introduce lubricant to the unit through said space comprises a lubricant container, an arm having an internal conduit communication between said container and a port on the arm, means to deliver a controlled quantity of lubricant from the container through the arm conduit and to discharge through the arm port, the arm being arranged to be engaged by the exposed portion of the rod moving across the arm port to wipe off the lubricant discharged therethrough.

8. A combination according to claim 7 wherein the arm is mounted for pivotal movement by the rod as the unit is moved past and thereafter to resume its position for engagement with a following rod.

References Cited in the file of this patent
UNITED STATES PATENTS

| | | |
|---|---|---|
| 960,696 | Pfeifer | June 7, 1910 |
| 1,364,464 | Timerman | Jan. 4, 1921 |
| 1,754,801 | Pribil | Apr. 15, 1930 |